(12) United States Patent
Kelley et al.

(10) Patent No.: US 7,386,732 B2
(45) Date of Patent: *Jun. 10, 2008

(54) INTEGRATED SYSTEM SECURITY METHOD

(75) Inventors: Edward E. Kelley, Wappingers Falls, NY (US); Franco Motika, Hopewell Junction, NY (US); Paul V. Motika, Hopewell Junction, NY (US); Eric M. Motika, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 93 days.

This patent is subject to a terminal disclaimer.

(21) Appl. No.: 11/381,436

(22) Filed: May 3, 2006

(65) Prior Publication Data

US 2006/0195901 A1    Aug. 31, 2006

(51) Int. Cl.
*H04K 1/00* (2006.01)
*H04L 9/00* (2006.01)

(52) U.S. Cl. .................. 713/184; 713/183; 726/16; 726/34

(58) Field of Classification Search ............. 713/184, 713/183; 726/16, 34
See application file for complete search history.

(56) References Cited

U.S. PATENT DOCUMENTS

| | | | |
|---|---|---|---|
| 4,910,775 A * | 3/1990 | Yves et al. ................. 713/184 |
| 5,086,216 A | 2/1992 | Mollet et al. |
| 5,248,007 A * | 9/1993 | Watkins et al. ............. 180/9.32 |
| 5,291,434 A | 3/1994 | Kowalski |
| 5,414,418 A * | 5/1995 | Andros, Jr. ................. 340/7.4 |
| 5,544,111 A | 8/1996 | Berthozat et al. |
| 5,619,707 A * | 4/1997 | Suboh ........................ 713/322 |
| 5,646,604 A * | 7/1997 | Maruyama et al. ......... 340/5.22 |
| 5,740,403 A * | 4/1998 | Kowalski ................... 711/164 |
| 5,774,525 A | 6/1998 | Kanevsky et al. |
| 5,898,783 A | 4/1999 | Rohrbach |
| 5,915,231 A | 6/1999 | Beffa |
| 5,946,497 A | 8/1999 | Lee et al. |
| 6,067,507 A | 5/2000 | Beffa |
| 6,100,486 A | 8/2000 | Beffa |
| 6,104,989 A | 8/2000 | Kanevsky et al. |
| 6,122,563 A | 9/2000 | Beffa |
| 6,147,316 A | 11/2000 | Beffa |
| 6,219,789 B1 * | 4/2001 | Little et al. ................... 726/34 |
| 6,321,335 B1 * | 11/2001 | Chu ............................ 726/28 |
| 6,641,050 B2 * | 11/2003 | Kelley et al. ................ 235/492 |
| 6,687,843 B2 * | 2/2004 | Kwak ........................ 713/500 |
| 7,076,663 B2 * | 7/2006 | Kelley et al. ................ 713/184 |

FOREIGN PATENT DOCUMENTS

EP        000428503 A2 *   11/1986

\* cited by examiner

*Primary Examiner*—Ayaz R. Sheikh
*Assistant Examiner*—Kaveh Abrishamkar
(74) *Attorney, Agent, or Firm*—Whitham, Curtis, Christofferson & Cook, PC; Kerry B. Goodwin

(57) ABSTRACT

Logic scan based design and electronic fuse (e-fuse) technology are combined to create a circuit macro function that is integrated in a non-critical area of a processor chip or related circuit to provide a new means of securing electronic systems and devices such as computers, appliances, consumer electronics, automobiles, etc. from theft or unauthorized use. Level sensitive scan design (LSSD) techniques are used in conjunction with e-fuses to inhibit or enable system components and sub-components based upon a pre-initialized configuration which must be enabled by a user via password entry.

11 Claims, 8 Drawing Sheets

INTEGRATED SYSTEM SECURITY METHOD

BACKGROUND OF THE INVENTION

1. Field of the Invention

The present invention generally relates to security methods of electronic devices and, more particularly, to a method of providing a means to prevent unauthorized use or theft of electronic equipment.

2. Background Description

The accelerated pace of integration and rapid miniaturization of electronic equipment, such as personal computers (PC), laptop personal computers, digital cameras, and video recording equipment, and similar equipment makes these expensive systems highly portable and easily susceptible to unauthorized use and theft. This problem can be further extended to larger home appliances, motor vehicles, electronic locks, and other consumer products.

These types of electronic equipment have no means to disable the equipment and render them useless in order to prevent unauthorized use or theft. The problems resulting from theft or unauthorized of such equipment often leads to the financial loss and inconvenience of procuring a new system, or the owner's proprietary information and confidential data stored within the system is exposed to potentially undesired uses.

Various common techniques have been utilized to provide some level of security to some devices. An example would be automobile radios and stereos which are often embedded with two parts that contain serialized identification that uses standard memory techniques such as common read-only-memories or static random access memories. These memory parts are inserted into the radios during the manufacturing phase. The result is a fixed permanent security code arrangement for that device only and no option exists to permit end users and owners to create a personalized identification code. This security technique typically relies upon whether a mating electronic piece, e.g., a faceplate, is connected to a main body. In order to secure the radio, a user must remove the mating piece in order to cripple the device and render it useless. This can be very inconvenient. No user known identification code capability is involved. The two parts, when mated and powered on, will verify that matching serialization exists before the device will function. This method does not lend itself to protecting multiple sub-components within the same system and is not easy to use.

Many techniques to secure electronic devices employ the use of software algorithms or passwords that are stored in readable memory or databases. Whenever software techniques are employed, circumvention is a possibility and detection of circumvention is difficult. In software based, password only protection schemes, the software itself is prone to alteration or modification which may permit specific or general unauthorized use or access to a system.

SUMMARY OF THE INVENTION

It is therefore an object of the invention to provide a means to secure valued electronic devices from unauthorized use.

It is another object of the invention to provide a means so that the electronic equipment is rendered inoperable if stolen or accessed without authorization.

It is still another object of the invention to require a password to activate the electronic equipment.

Further, it is yet another object of the invention to implement the security mechanism whereby it cannot be replicated or circumvented.

According to the invention, an integrated security solution renders a system such as personal computers, cameras, video equipment, portable electronic equipment, or any electronic controlled device useless and worthless unless the proper password is provided. The invention implements this solution in such a way so that security cannot be overcome by software by-passes or work-around. The system sub-components also become unusable and non-transferable, thereby nullifying the purpose for theft, i.e., each significant sub-component of the system is provided a means to participate in the security method of the system. This protects sub-components from theft or misuse, not just the entire system. Conversely, it provides protection against a system sub-component being replaced with an unauthorized substitute.

The invention combines several technologies to produce a new and novel capability. Scan design methods, electronic fuse (e-fuse) support, and a software security process are combined to personalize each significant integrated chip and sub-component in the system or device with a unique security code. This security code becomes a part of the system and is not readable or obtainable from outside of the system and cannot be circumvented by software. Inherent in the security code is a user password which is created and permanently burned into the system and must be known thereafter and entered into the system by the user in order to activate normal operation.

Electronic fuse registers are the permanent means of personalizing the password into the system and its sub-components. These fuses are addressable and can be configured, or blown, to represent personalized information. Once blown, i.e., permanently configured, the result creates a personalized access code on the system and can be extended to control any sub-component or chip within the system. The personalized password access code, which is encoded in the c-fuse register configured scan chain storage elements, can be chosen by the consumer at initial use time, by the manufacturer of the system prior to delivery, or by an intermediary vendor or business.

The scan design technique employed by this invention provides a simple serial interface to all the fuse registers in the system. The scan design technique permits the reading of all the fuses during the password authentication stage which if valid permits the enablement of each system component. The scan design technique employed is the level sensitive scan design (LSSD) methodology. In such a design, all the storage elements, such as latches and registers, are concatenated together and are accessible via serial input or outputs.

This method can be employed in services that rent or lease equipment to assure that only the intended parties are able to access the equipment.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
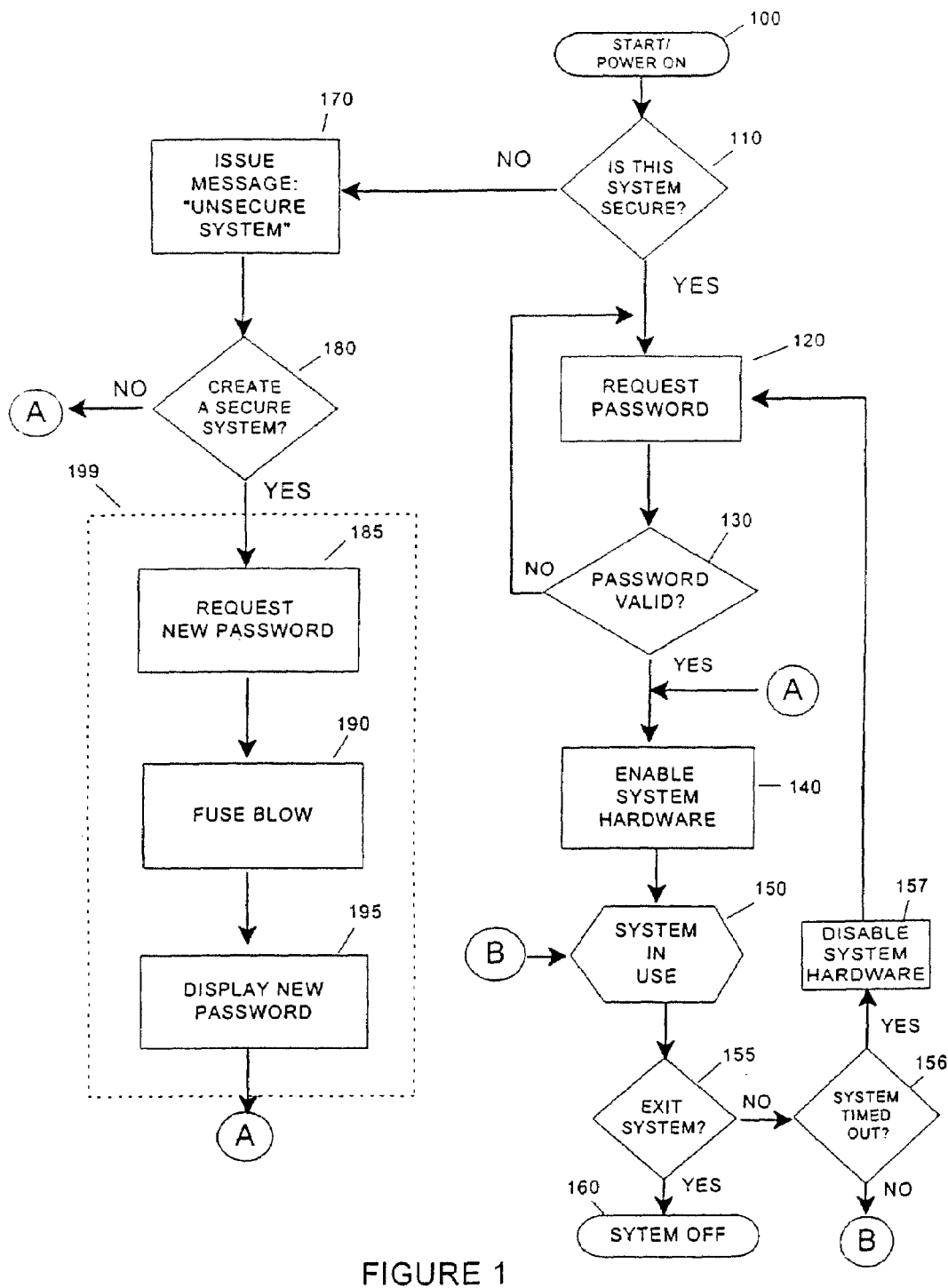
FIG. 1 is a flow diagram illustrating the overall secure process.

Referring now to the drawings, and more particularly to FIG. 1, there is shown an overall flow of the security process and gives a general orientation of the nature of the invention's use. Since this invention provides a means to secure electronic devices or devices containing electronic controls, FIG. 1 illustrates the main elements of the process of securing a new device or system the first time, and it also shows the steps to gain access to a device that has previously been secured. The process begins at 100 by powering on the device or system. The login utility software checks in decision block 110 whether the device or system is a secured or unsecured system. The login procedure typically is under a software utility control, but may be implemented entirely in hardware for devices with no significant software elements. An unsecured system is one that has never executed a securing procedure 199 for the device or system and is completely open for general access or use since no password has been encoded in the hardware. The case of an unsecured system becoming a secured system is described first.

If the system is unsecured as detected by the login utility, the system reminds the user in function block 170 of this condition by issuing an exemplary general notice such as "UNSECURED SYSTEM". Alternatively, status indicators such as light emitting diodes (LEDs), plasma displays, or liquid crystal displays (LCDS) using characters or symbols could be employed to reflect the condition of the device or system as being secured or unsecured. In certain devices, an audio tone or voice response unit can provide this secured/unsecured condition notice to the user. It is feasible that color is the means to indicate the secured/unsecured status of the device. The particular manner of indication is related to the type of device or system that embodies this invention.

Once the unsecured message or status is issued, the system asks the user in decision block 180 if the securing procedure 199 should be initiated. The user may decline in which case the system is activated at function block 140 in the unsecured mode with general access to the device possible. Any security that might then exist is through traditional software only schemes which are commonplace in devices such as personal computers.

If the user indicates that the securing procedure 199 should be invoked, the securing utility software, or its equivalent in hardware implementations, prompts the user in function block 185 for the password that will he permanently stored and burned into the electronic fuse array. The size of the password, and hence the size of the e-fuse array and latch string as explained further in this disclosure, is related to the security level desired in the device, i.e., the greater the security need, the more digits and characters must be implemented in the device. This decision as to the size of the password is related to the specific requirements of the device employing this invention and is beyond the scope of this disclosure. For exemplary reasons, this disclosure refers to 8 character (64 bit) implementations, however, any size could be implemented it the password that is entered by a user in response to the request is suitable in content and size, the password is then committed to the latch string via an e-fuse array in function block 190 giving the system its unique security protection. The burning of the password into a string of latch registers controlled by e-fuses is an essential part of this invention and is described in more detail later in this disclosure. If a display or means to communicate to the user exists such as the case of one mode of a preferred embodiment, a personal computer, the new password is then displayed to the user in function block 195 as a confirmation of the burn process. The device or system is now secured and any indicators that may exist in the device are updated to reflect the secured mode of the device.

Once the e-fuses are blown, the system and sub-components are enabled in function block 140 using the secured logic of the e-fuse registers as described in more detail below. Also at function block 140, an optional system time-out timer is started which will permit the operation of the secured system for a predetermined time. The system is now operational and remains in use shown at function block 150 until the user turns the system off at 160. The cycle repeats when the system is powered on again at starting point 100.

When a system, which has been previously secured, is powered on, the login utility detects that the device or system has already been secured at decision block 110 and proceeds to request the password from the user in function block 120 which will enable the system hardware. Note that the system is not yet fully enabled at the hardware level and main components and sub-components using this invention cannot function. No software means without the entered password can by-pass this hardware-centric mechanism. The password is validity checked by the software in decision block 130, i.e., it is checked for proper length limit and character content which is an optional step. This password is then written to the hardware. If the entered password is the same password that was permanently burned into the latch string controlled by the e-fuses (the combination of the latch string controlled by the e-fuses constitute the core of this present invention), the hardware enables the system and related sub-components at function block 140 and remains enabled until the system is turned off at 160 or the system times out at decision step 156 and system hardware is disabled at function block 157.

Level sensitive scan design (LSSD) is a logic scan design method employed in this invention. The technology is discussed in two articles: E. B. Eichelherger and T. W. Williams, "A Logic Design Structure for LSI Testability", Proceedings of the 14th Design Automation Conference, New Orleans, 1977, pp. 462-468, and P. H. Bardell and W. H. McAnney, "Self-Testing of Multichip Modules," Proceedings of the IEEE International Test Conference, 1982. pp. 200-204.

Figure 2:
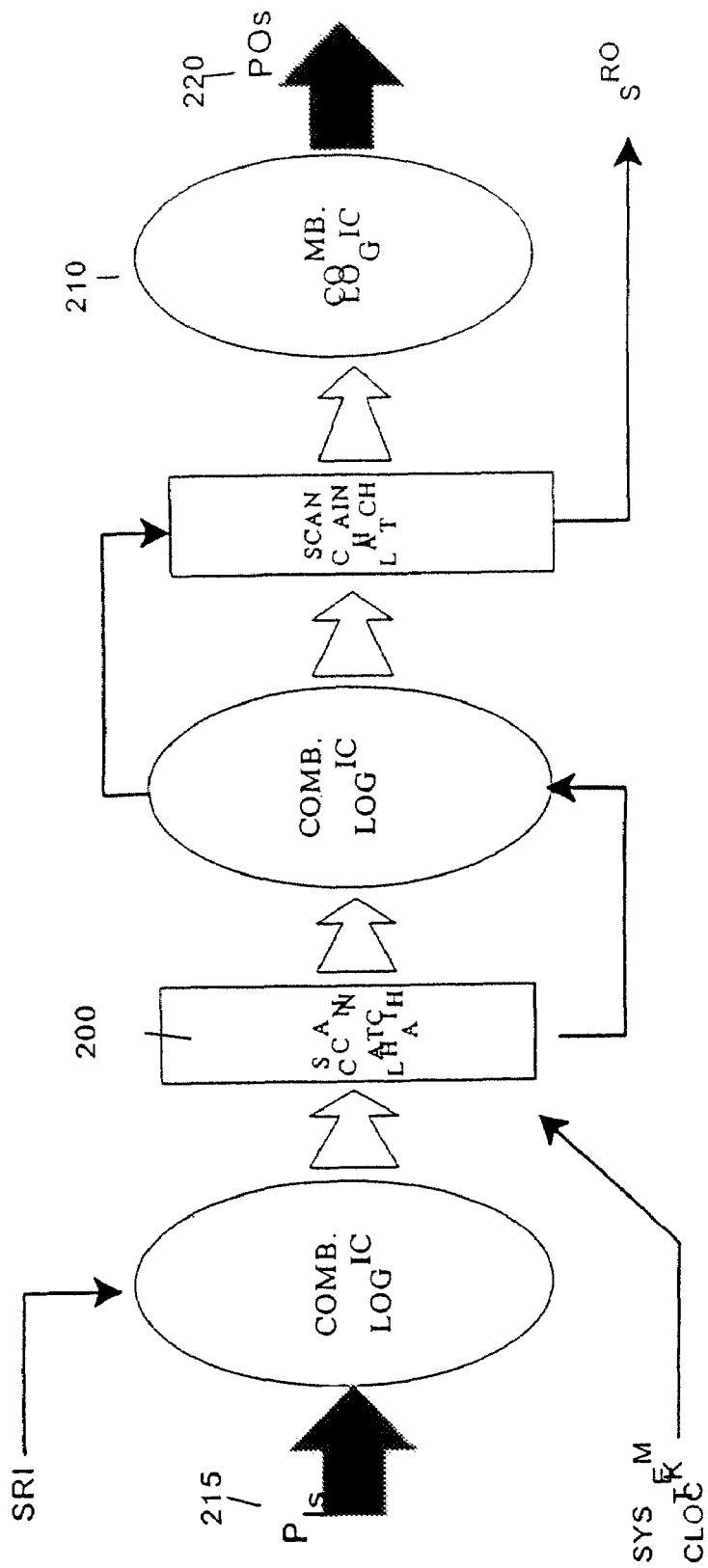
FIG. 2 is a functional block diagram of a typical level sensitive scan design (LSSD) configuration.
Figure 2A:
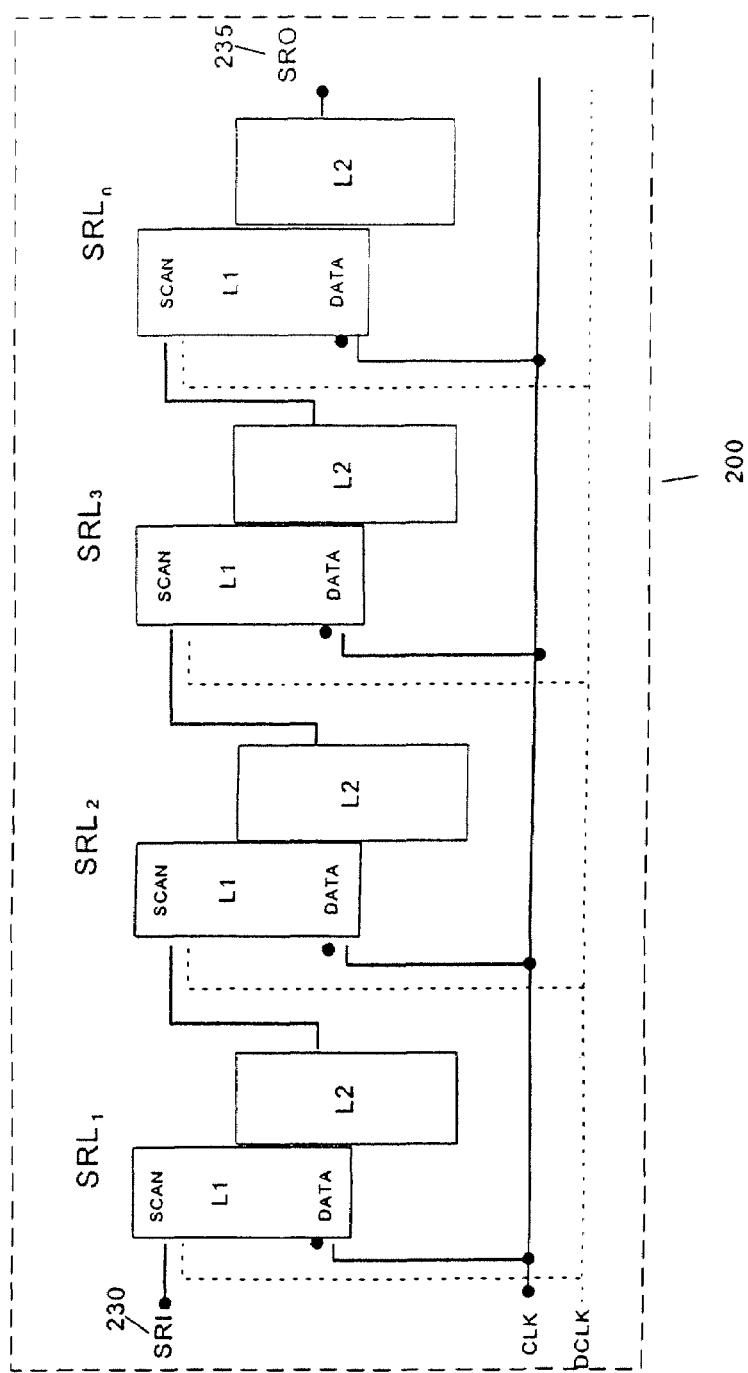
FIG. 2A is a block diagram of a typical LSSD scan chain.

Referring to FIG. 2 and FIG. 2A, LSSD methodology is a system design and a Design-for-Test (DFT) approach that incorporates several basic test concepts, i.e. scan design. In such a design most of the device's storage elements, such as shift registers and latches (SRL) are concatenated in one or more scan chains 200 which can be externally accessible via one or more serial inputs 230 and outputs 235. Storage elements that are not in this category are usually memory or other special macros that are isolated and tested independently. Furthermore, this design methodology ensures that all logic feedback paths are gated by one or more of these storage elements, thereby simplifying a sequential design into subsets of combinational logic sections 210.

Figure 3:
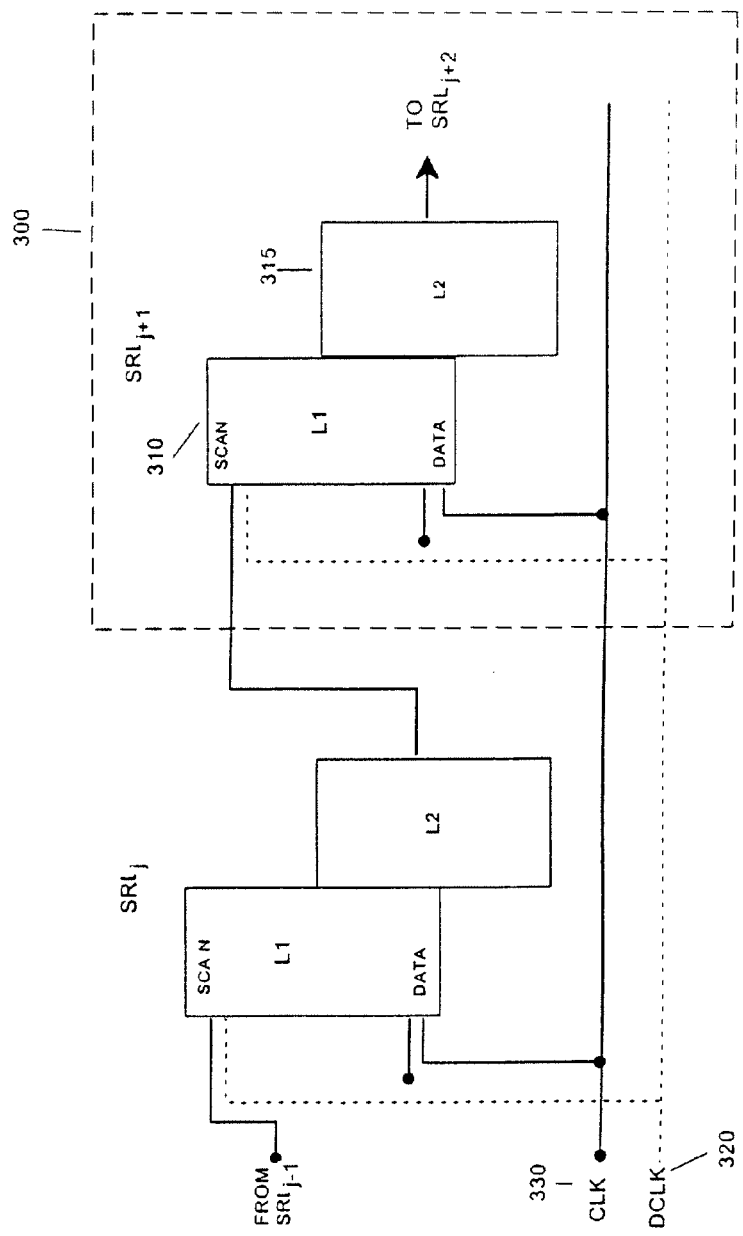
FIG. 3 is a block diagram of a typical LSSD latch pair.

These basic design concepts in conjunction with the associated system and scan clocking sequences greatly simplify the test generation, testing, and diagnosability of very complex logic structures. Every latch can be used as a pseudo Primary Input (PI) and as a pseudo Primary Output (PO) in addition to the standard PIs 215 and POs 220 to enhance the stimulation and scrutiny of the device being tested or diagnosed. Referring now to FIG. 3 which shows two sets of shift register latch pairs (SRLj, $SRL_{j+1}$), LSSD latches are typically implemented in a L1/L2 configuration 300 where the L1 or master latch 310 has two data ports and may be updated by either a scan clock 320 or a functional clock 330. The L2 or slave latch 315 has only one clock input and that clock is out of phase with both L1 clocks. Scanning is done using separate A and B clocks. Now combining this technology with e-fuse technology, a user's personal ID or password can be encoded via a string of latches.

Electronic fuse concept consists of several techniques and circuits. These integrated fuses can be personalized at a proper step in the manufacturing or test process and can be utilized in several ways to improve the performance, yield, and traceability of a product. In the case of this invention, it provides personalized identification via encoding the password discussed above.

In very large scale integration (VLSI) chip manufacturing, these fuses are often used to repair defective sections of the chip by logically reconfiguring or replacing defective sections of the chip, thereby increasing the effective yields. This is common in large array or memory structures where a single defective memory cell can render the chip unusable. By designing memory array structures with redundant word and/or bit lines, and by providing "writeable" fuses for these redundant lines, one can easily swap the defective line (or multiple lines) and reconfigure the array to be fully functional. This fuse repair action can have significant yield impacts throughout the product cycle.

Another use of integrated fuses is to enhance product traceability from chip test to field system usage. Each chip can be personalized with a unique chip-id early in the semiconductor foundry manufacturing process.

This chip-id usually consists of the wafer lot, wafer-id, and chip X-Y coordinates on the wafer, allowing for individual chip tracebility throughout the products life span.

A typical fuse consists of narrow and short metal strips or "shorts" that can be "opened" or "burned" when being written. These fuse metal strips are usually located on the periphery of the chip near the surface where they can be easily located and burned with minimal impact to the active area of the chip. The key parameters associated with integrated fuses are that they should be "writtable" or "burnable", have minimal impact on system performance and power, be highly reliable, require relatively small silicon real estate area, and have a simple read and write interface.

Two common types of integrated fuses in use in today's VLSIs are similar in function, but differ in the personalization methodology. The first type utilizes an external laser to cut or burn the desired fuse. This method has been used for many years and shown to be highly reliable, but requires additional processing steps and special equipment. The second type is based on applying a relatively large electric current pulse to blow the fuse. The advantage of the second type is that the fuses can be blown any time without the need for special equipment, but the fuse write support circuit must provide the function and drive necessary to blow these fuses.

The integrated system security concept of this invention is based on this second type of electronic fuses (e-fuses) that allows chip personalization after the device and system has been assembled and is operational. Similarly, the concept is also based on the scan design methodology that allows a simple serial interface to all the fuses during the personalization process. The combination of the e-fuse with the scan chains creates a unique storage element.

Figure 4:
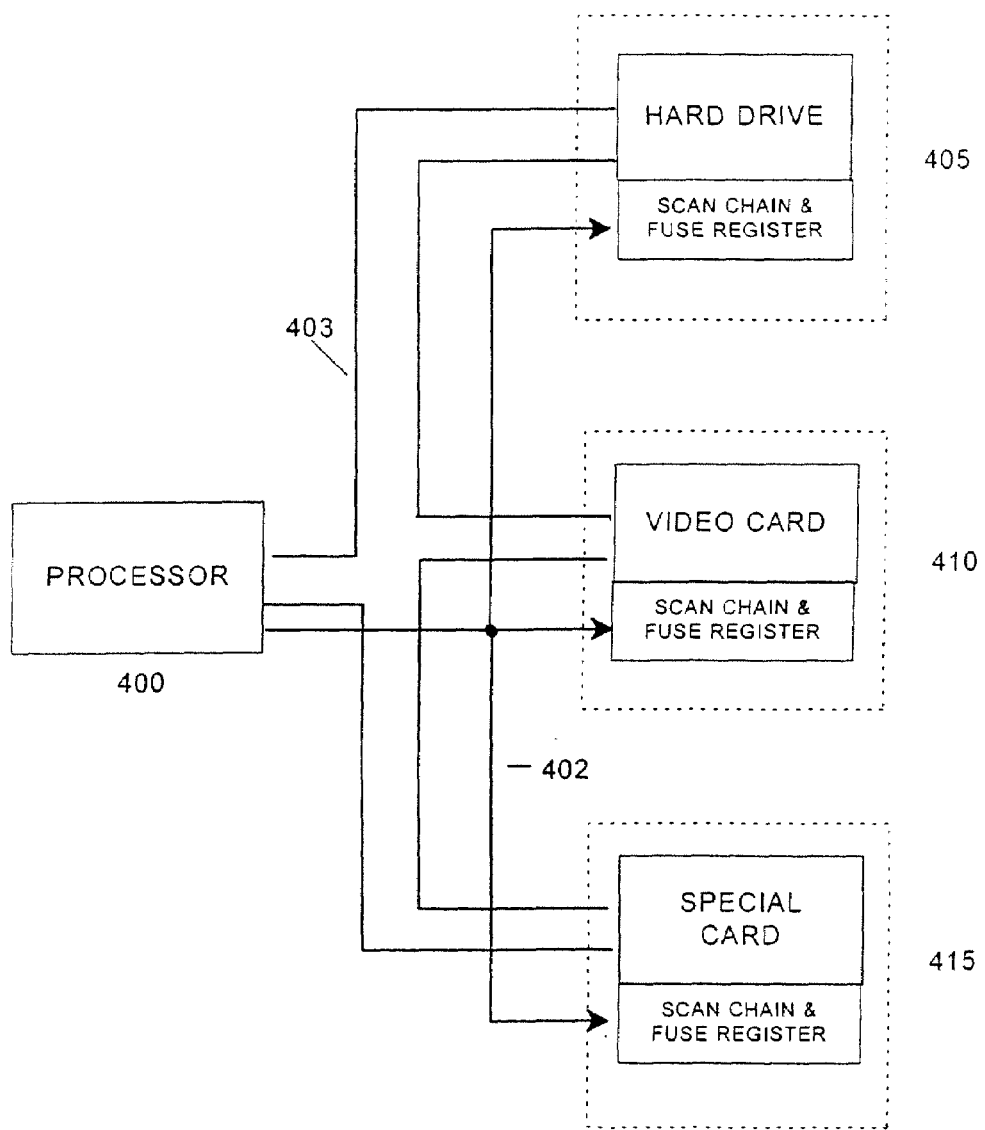
FIG. 4 is a block diagram to illustrate use of scan chains in multi-component system.
Figure 5:
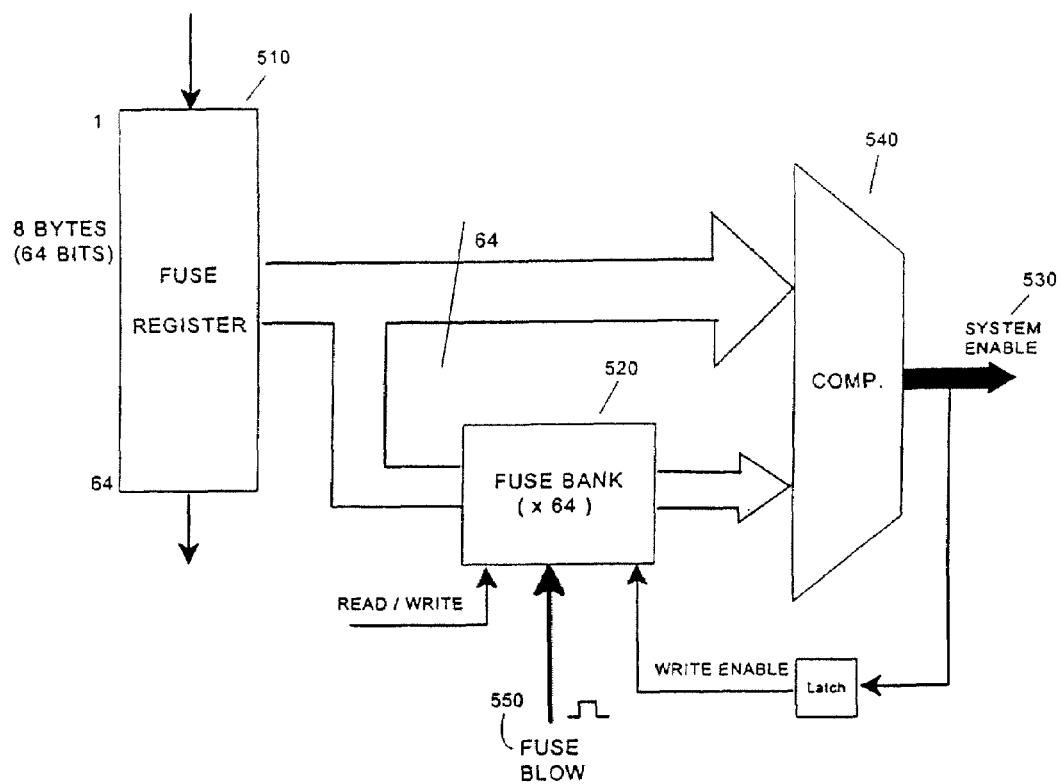
FIG. 5 is a functional block diagram illustrating electronic fuses in a secure mode.

The hardware implementation of the above combined methodology is simple and requires relatively low circuit overhead. A typical scan based multi-component system configuration is shown in FIG. 4. This exemplary system includes a hard drive 405, video card 410, and a special card 415 which is meant to represent any card that performs a unique function. Each of these components has embedded within it, either physically or logically, a scan chain which includes a fuse register. The processor 400 is connected by a parallel bus 403 to each of these components as is commonly practiced. Additionally, the processor has access to the scan chain via a serial connection 402. The fuse register contained within each component can be loaded serially, for all the components, with the customized id. code during system power-on and initialization. When securing the system for the first time, the fuse register is loaded with the id code and then used to blow the fuses in each component's fuse bank. Alternatively, when a secure system is used in the normal mode, the fuse register is used to verity authorized access to the system. If a user password is incorrect, the components will not be enabled by the scan chain. FIG. 5 shows the security fuse functional diagram for each component which could be encapsulated in a chip. The fuse register 510 is a portion of the scan chain and in this example is 64 latches long. This 64 bit storage can encode an eight-character id code. Of course, the length of the fuse register and associated fuse bank 520 can be made larger, but for general security applications 64-bits offers sufficient combinations (i.e., $2^{64}$ possible combinations). For extremely high security requirements this could be extended in length to 128-bits or more. It is also possible to use the scan chain to control sub-components as well such as individual chips or modules on a mother board.

Figure 6:
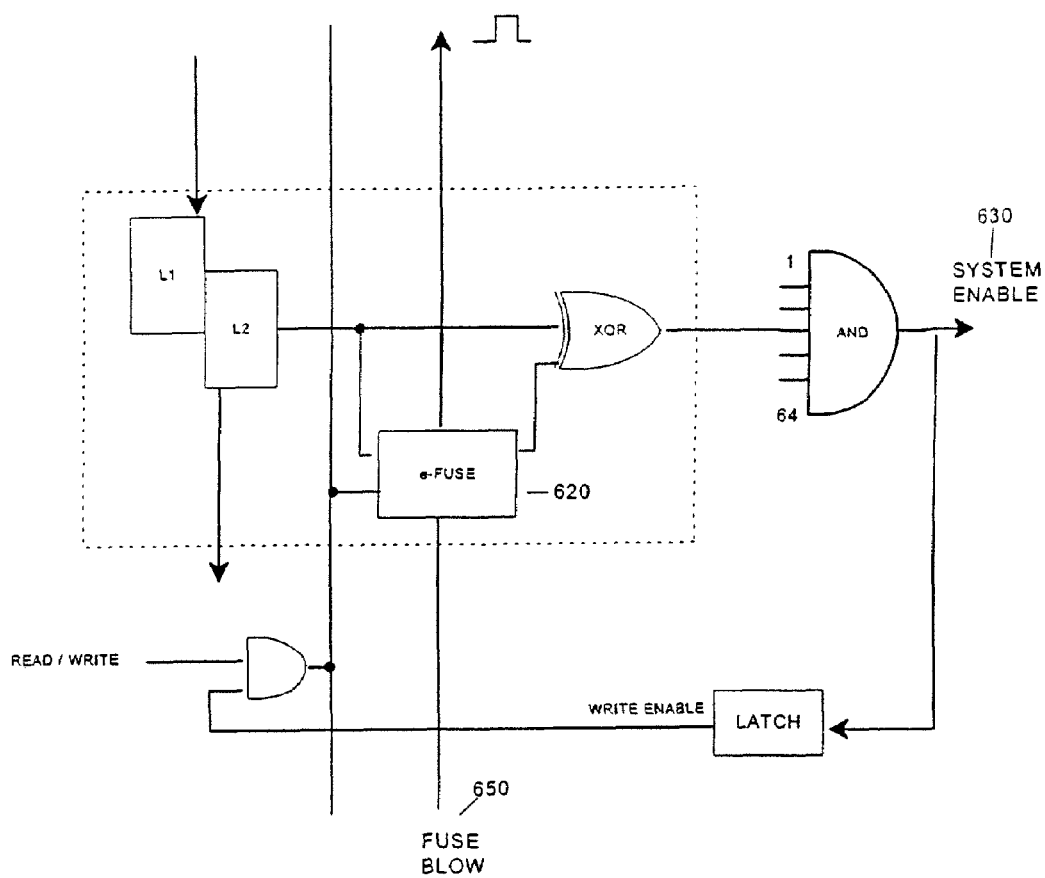
FIG. 6 is a logic diagram illustrating electronic fuse control logic.
Figure 7:
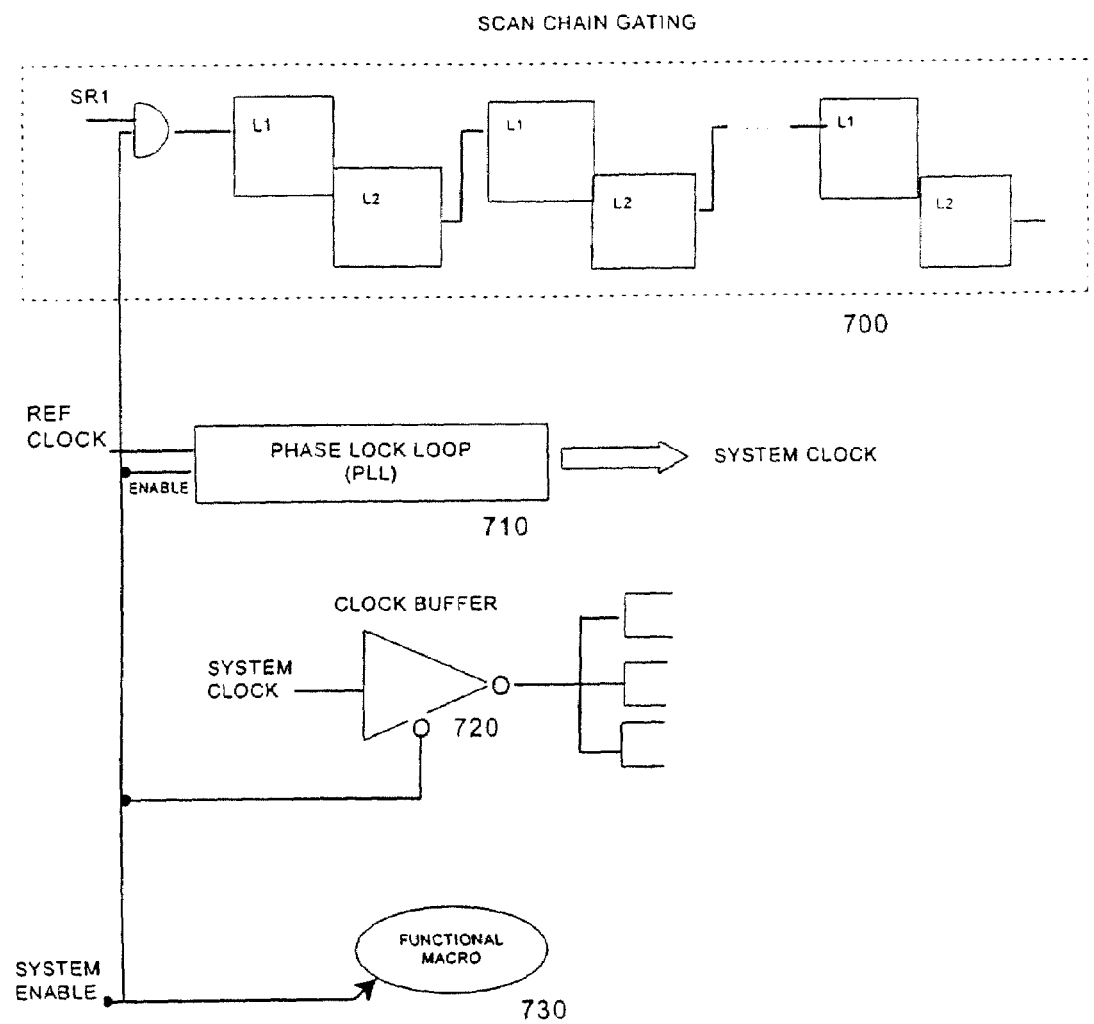
FIG. 7 is a functional diagram showing various ways the invention can be used to enable a system.

Referring to FIG. 5 and FIG. 6, the fuse bank 520 consists of e-fuses 620 that can be written only after the system has been enabled 530 and 630. This can be accomplished on an "unsecured" system by providing all zero's as the id code, since on a new system none of the fuses are blown. Once the system is enabled, a new id code can be loaded and the fuses blown 550 650 accordingly by the fuse blow utility software, securing procedure 199. This process secures the system and the blown id code will be required to enable the system the next time it is powered-on. During normal system power-on, the system securing procedure 199 (FIG. 1) requests the id code and the hardware comparator 540 compares this user entered code to the id code burned or written in the fuse bank 520. If there is a match, the system is enabled shown at 530. The system enable/disable function can be implemented in several ways, such as gating the system clocks or other critical system functions on each chip or component. The examples of FIG. 7 shows different methods of enabling a system after a proper security password has been entered. A system can be disabled by gating scan chains 700, disabling a phase lock loop 710, disabling a system clock distribution tree 720, or by disabling a critical function macro 730. One or more of these enabling/disabling methods can be used in any given system. One or more comparators and scan chains may be required. Other methods can also be implemented depending on the specific system design, the concept is basically the same (i.e., disable a critical distributed function until a proper password is entered to enable the system or component). The specific chip enabling depends greatly on the individual chip design and is beyond the scope of this disclosure.

With proper access to the password, a secured system's id code can be altered several times if required by special circumstance, but the resulting id code will be the "OR"ed function of the current id code and the new id code. It might also be specifically prohibited by a specific manner of implementation. This is accomplished by writing the new id code over the existing one once the system has been enabled using the existing id code. This "OR"ing limitation arises since once a fuse has been blown it remains blown, and only un-blown fuses can change state. This technique can provide some level of alteration of passwords, and its availability will be implementation specific.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for altering a password stored in a secure electronic device, comprising the steps of
   concatenating one or more scan chains to create a storage element;
   connecting the storage element to a comparator within an electronic circuit wherein an output of the comparator enables a system component;
   receiving a password from a user which becomes an original security id code;
   configuring one or more said scan chains to customize the storage element which represents said original security id code by blowing electronic fuses; and
   writing an update code over the original security id code to create a new security id code, whereby the new security id code is an OR-function product of the original security id code and the update code.

2. A method according to claim 1, wherein the scan chains are composed of latches or registers and are accessible externally via one or more serial inputs or outputs.

3. A method according to claim 1, wherein the scan chains are sufficiently long in order to represent passwords of variable lengths and to contain a security id code.

4. A method according to claim 1, wherein the electronic fuses are blown if the current security code id is provided to enable the securing process to occur.

5. A method according to claim 1, wherein the password is compared by the comparator to contents of the storage element.

6. A method according to claim 1, wherein the password is validated for size limits and character content.

7. A method according to claim 1, wherein the storage element is a plurality of storage elements.

8. A method according to claim 1, wherein the comparator is a plurality of comparators.

9. A secure electronic device with an alterable, fuse-encoded password, comprising:
   a scan chain which is configured using electronic fuses to represent an original security id code;
   a comparator that compares a password entered by a system user to the original security id code;
   an output of the comparator which can enable an electronic component or electronic device; and
   a fuse programmer for creating a new security id code by programming the fuses according to an update code received from a user, wherein the new security id code is an OR-function product of the original security id code and the update code.

10. An integrated security device as recited in claim 9 wherein the scan chain is a plurality of scan chains.

11. An integrated security device as recited in claim 9 wherein the comparator is a plurality of comparators.

* * * * *